(12) United States Patent
Levenglick et al.

(10) Patent No.: US 8,020,067 B2
(45) Date of Patent: Sep. 13, 2011

(54) APPARATUS AND METHOD FOR DETECTING AN END POINT OF AN INFORMATION FRAME

(75) Inventors: Dov Levenglick, Herut (IL); Ron Bercovich, Kfar-Saba (IL); Eliezer Zand, Hod Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 1109 days.

(21) Appl. No.: 11/721,651

(22) PCT Filed: Dec. 13, 2004

(86) PCT No.: PCT/IB2004/004410
§ 371 (c)(1), (2), (4) Date: Jun. 13, 2007

(87) PCT Pub. No.: WO2006/064309
PCT Pub. Date: Jun. 22, 2006

(65) Prior Publication Data
US 2010/0107035 A1    Apr. 29, 2010

(51) Int. Cl.
*H03M 13/00* (2006.01)

(52) U.S. Cl. ........................................................ 714/758

(58) Field of Classification Search .................. 714/758, 714/752, 792, 712, 795, 821
See application file for complete search history.

(56) References Cited

U.S. PATENT DOCUMENTS

| | | | |
|---|---|---|---|
| 5,784,387 A * | 7/1998 | Widmer | 714/752 |
| 6,445,755 B1 * | 9/2002 | Chung et al. | 375/341 |
| 6,891,881 B2 * | 5/2005 | Trachewsky et al. | 375/143 |
| 7,592,933 B2 * | 9/2009 | Widmer | 341/61 |
| 7,665,010 B2 * | 2/2010 | Fisher-Jeffes et al. | 714/792 |
| 2003/0069017 A1 | 4/2003 | Ahmed et al. | |
| 2004/0091067 A1 | 5/2004 | Ammer et al. | |

FOREIGN PATENT DOCUMENTS

| | | |
|---|---|---|
| EP | 1370006 A2 | 12/2003 |
| EP | 1387516 A1 | 2/2004 |
| GB | 2389020 A | 11/2003 |
| JP | 2004153372 A | 5/2004 |

* cited by examiner

*Primary Examiner* — Fritz Alphonse

(57) ABSTRACT

A method for locating an end of a received frame includes providing hypothetical trellis paths that end at different possible end points, performing a CRC check for each hypothetical trellis path, calculating a false detection variable for hypothetical trellis paths that passed the CRC check, and determining the end point of the received frame in response to the calculations.

24 Claims, 5 Drawing Sheets

APPARATUS AND METHOD FOR DETECTING AN END POINT OF AN INFORMATION FRAME

FIELD OF THE INVENTION

The invention relates to an apparatus and a method for detecting an end point of an information frame.

BACKGROUND OF THE INVENTION

Telecommunication usually includes transmitting sequences of electromagnetic symbols over a medium, such as but not limited to a wireless medium. During the transmission the sequence can be corrupted. Modern transmitters and receivers apply various measures to overcome said corruption and to provide robust communication links.

Transmitters usually receive an input information sequence and encode it by a forward-error correction device such as a convolutional encoder. The convolutional encoder generates an encoded information sequence that includes the input information signals as well as redundant signals. The encoded information sequence can be further processed in various manners and can also be modulated before being transmitted over the medium.

U.S. patent application 2004/0091067 of Ammer at al. titled "System and method for one-pass blind transport format detection", which is incorporated herein by reference, provides a brief description of various processing stages applied by modern wideband code division multiple access (WCDMA) transmitters and modern WCDMA transmitters.

Receivers usually demodulate received signals and process them in order to reconstruct the input information signal sequence. The reception process usually includes Viterbi decoding.

Viterbi decoding is well known in the art. The following U.S. patents and patent applications, all being incorporated herein by reference, provide an example of prior art Viterbi decoders and Viterbi decoding methods: U.S. patent application 2003/0028844 of Coombs, titled "Method and apparatus for implementing a single cycle operation in a data processing system"; U.S. Pat. No. 6,575,864 of Hansquine, titled "method and apparatus for efficiently reading and storing state metrics in memory for high-speed ACS Viterbi decoder implementation"; U.S. patent application 2002/0126776 of Muck et al., titled "Viterbi decoder, method and unit therefore"; U.S. Pat. No. 5,987,638 of Yu et al., titled "Apparatus and method for computing the result of a Viterbi equation in a single cycle".

Typically, the receiver has to know in advance the length of the received information sequences (also referred to as information frames, information blocks). Said knowledge can improve the performance of receivers and in some cases can even be critical.

Some telecommunication protocols, standard and methods use variable length information frames. For example, the third generation partnership project (3GPP™) defined a telecommunication protocol that uses variable sized frames (also referred to as communication channels).

More specifically, the standard defined multiple operational modes and three possible sizes of communication channels (class A, class B and class C) per mode. This protocol was defined in various papers including technical specification 3GPP TS 25.212 V6.0.0 which is incorporated herein by reference.

The transmitter can send to the receiver size information representative of the size of a transmitted information frame.

On the other hand, the receiver can determine the size of a received information frame by its own. A well known method for determining the length of an information packet in knows as blind transport forward detection. This algorithm is described in Annex A of the 3GPP TS 25.212 V6.0.0, which is incorporated herein by reference.

In a nut shell, the blind transport forward detection (BFTD) algorithm (or sequence) includes applying forward trellis processing (also known as Viterbi decoding or feed forward process), a complex calculation of a variable denoted $S(n_{end})$, and a comparison of this variable to a predefined threshold D. If $S(n_{end})$ is equal to D or smaller than D then the algorithm proceeds by performing a Viterbi trace back process and applies a cyclic redundancy check (CRC) on the results of the trace back process.

The size of the information frame (or the location of the information frame end) can be determined by selecting one end point out of a known group of possible end points. If more than a single possible end point passes the CRC test and it's $S(n_{end})$ is smaller than D then the algorithm selects the end point that is associated with the smallest $S(n_{end})$. It is noted that the receiver can determine that the reception failed.

In mathematical terms $S(n_{end}) = -10 \, \text{Log}((a_0(n_{end}) - a_{min}(n_{end}))/(a_{max}(n_{end}) - a_{min}(n_{end})))$, wherein $a_0(n_{end})$ is the path metric value at zero state of the trellis stage that corresponds to the $n_{end}^{th}$ possible end point, $a_{min}(n_{end})$ and $a_{max}(n_{end})$ are the minimum and maximum path metric values among all survivor paths of that trellis stage. In a typical trellis graph each trellis stage include $2^{T-1}$ states where T is the length of the convolutional encoder. In standard 3GPP TS 25.212 V6.0.0 T equals nine. Thus, the search for the minimal and maximal survivor paths is quite long.

U.S. patent application 2004/0091067 of Ammer et al. suggests to calculate a threshold $T(n_{end})$ and to compare it to zero, instead of calculating $S(n_{end})$ and comparing it to D. $T(n_{end}) = 10^{D/10} * ((a_{max}(n_{end}) - a_{min}(n_{end})) - (a_0(n_{end}) - a_{min}(n_{end}))$.

FIG. 1 illustrates an information frame 10, nine possible end points 11-19, and a portion of a trellis diagram 20 that corresponds to that information frame 10. The information frame 10 includes a payload, CRC bits and empty bits (a sequence of zero bits). The trellis diagram 20 includes multiple trellis stages, wherein nine trellis stages are associated with the nine possible end points. Each of these nine trellis stages is associated with an $n_{end}$ value that range between one to nine.

FIG. 2 illustrates a prior art method 30 for blind transport forward detection algorithm, as it appears in said Annex A of the 3GPP TS 25.212 V6.0.0.

Method 30 starts by stage 32 of setting $n_{end}$ to one (starting from the first possible end point), setting another variable $n_{end}'$ to zero and setting $S_{min}$ to D.

Stage 32 is followed by stage 34 of performing Viterbi decoding (also referred to as forward trellis process or trellis feed forward process) from a start point to the trellis stage that corresponds to the $n_{end}^{th}$ possible end point.

Stage 34 is followed by stage 36 of calculating $S(n_{end})$.

Stage 36 is followed by query stage 38 of determining if $S(n_{end})$ is greater than D. If $D \geq S(n_{end})$ then query stage 38 is followed by stage 40 of performing a trace back process from the $n_{end}^{th}$ possible end point, in order to provide an $n_{end}^{th}$ hypothetical trellis path. If $D < S(n_{end})$ then stage 38 is followed by query stage 50.

Stage 40 is followed by stage 42 of calculating CRC parity bits for the $n_{end}^{th}$ hypothetical trellis path.

Stage 42 is followed by query stage 44 of checking if the CRC passed or failed and if the CRC failed query stage 44 is followed by query stage 50. If the CRC passed then query stage 44 is followed by stage 46 of comparing $S(n_{end})$ to $S_{min}$.

If $S(n_{end})<S_{min}$ then query stage 46 is followed by stage 48 of setting $S_{min}$ to $S(n_{end})$ and setting $n_{end}'$ to $n_{end}$. Else query stage 46 is followed by query stage 50. Stage 48 is followed by query stage 50.

Query stage 50 involves checking if stages 34-48 were applied to all possible end points ("is $n_{end}$ the maximal value?").

If the answer is negative than query stage 50 is followed by stage 52 of increasing $n_{end}$ and jumping to stage 34.

If all the possible end points were checked query stage 50 is followed by stage 54 of providing the end point associated with $n_{end}'$ as the selected frame end point. If the value of $n_{end}'$ is zero the received frame is declared to be in error.

There is a need to provide an efficient method and apparatus for locating an end of an information frame.

SUMMARY OF THE PRESENT INVENTION

A method an apparatus for locating an end of an information frame, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The inventors applied the method for detecting an end of an information block within a MSC8126 chip that included four StarCore 140™ cores that can be selectively connected to one Viterbi co-processor, for applying various algorithms such as feed forward decoding, feed forward channel equalization, trace back, BFTD, and the like. It is noted that the provide method and devices are not limited to said configuration.

The inventors tested the efficiency of the method that is the subject matter of this patent application by providing a class A and class B information packets to a VCOP module. A CRC calculation required about nine-hundred and fifty clock cycles, while the computation of $S(n_{end})$ required about ten-thousand clock cycles. Seventeen hypothetical trellis path were provided and only two passed the CRC test. The method required about thirty five thousand clock cycles. The appliance of the prior art method required about one-hundred and sixty five thousand clock cycles. It is further noted that the amount of clock cycles of the suggested method can be further reduced by executing various processes (such as trace back and CRC check or even $S(n_{end})$ calculation) in parallel.

It is further noted that the various stages of the method can be executed by one or more processors. Wherein a processor is a device that is capable of processing information. A processor can execute software, but this is not necessarily so as pure hardware components can be able to perform information processing operations. It is further noted that if more than a single processor is involved in the execution of said method than the processors can be integral to each other, located in distant locations and the like.

Figure 3:
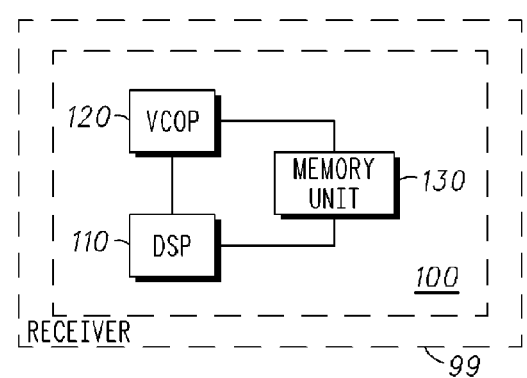
FIG. 3 illustrates an apparatus for detecting an end of an information frame, according to an embodiment of the invention.
Figure 2:
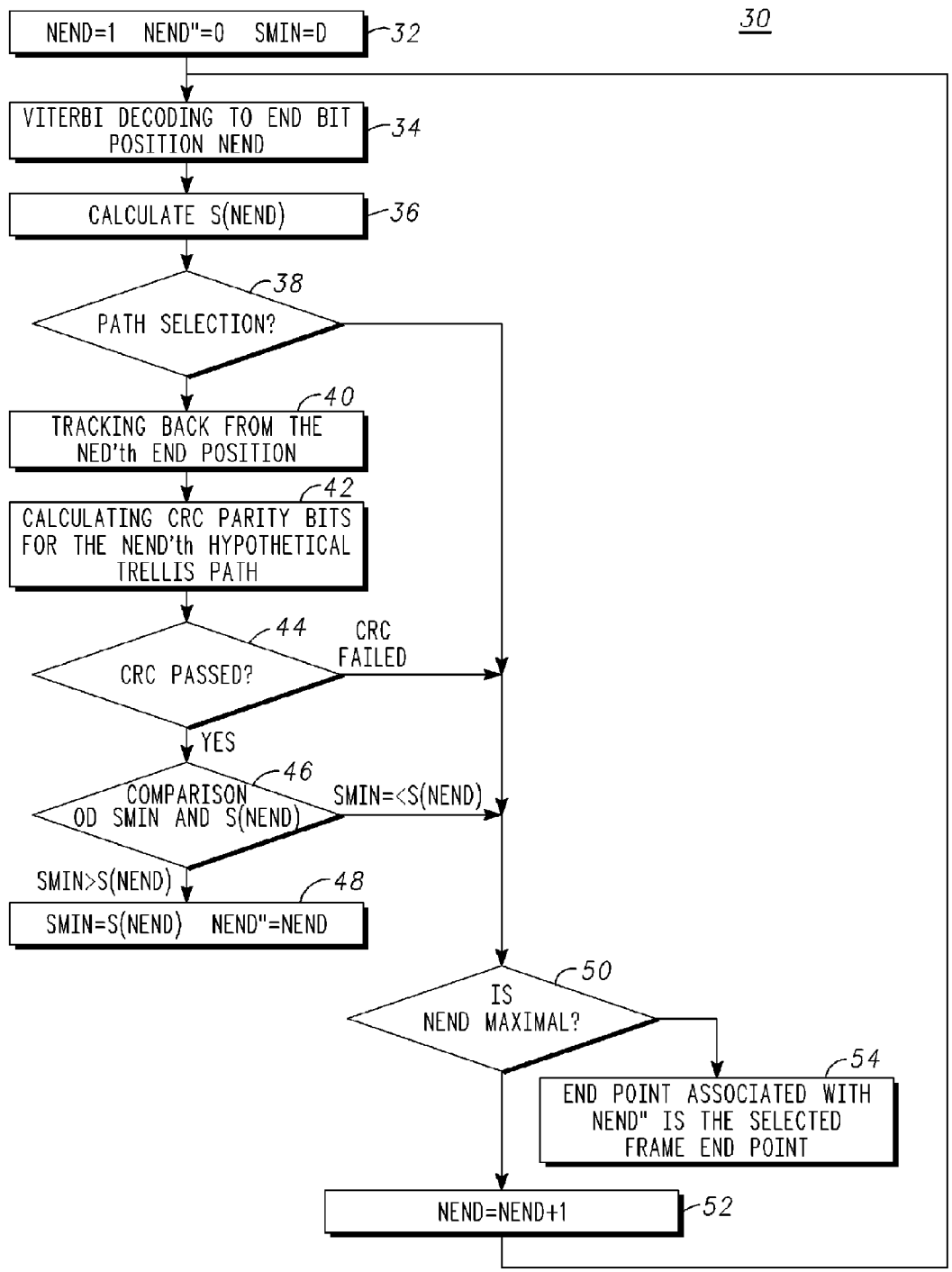
FIG. 2 illustrates a prior art method for blind transport forward detection algorithm.

FIG. 3 illustrates an device 100 for detecting an end of an information frame, according to an embodiment of the invention.

Device 100 includes a digital signal processor (DSP) 110, a Viterbi co-processor (VCOP) 120 and a memory unit 130.

DSP 110 can configure the VCOP 120 and VCOP 120 can generate interrupt requests to DSP 110. Both processors 110 and 120 can access the memory unit 130.

Device 100 is conveniently included within a receiver, such as receiver 99, that includes other components such as but not limited to an antenna, an RF interface, a frequency downconverter, and the like. The receiver can be located within a base station, but this is not necessarily so. For simplicity of explanation the other components are not illustrated.

Figure 4:
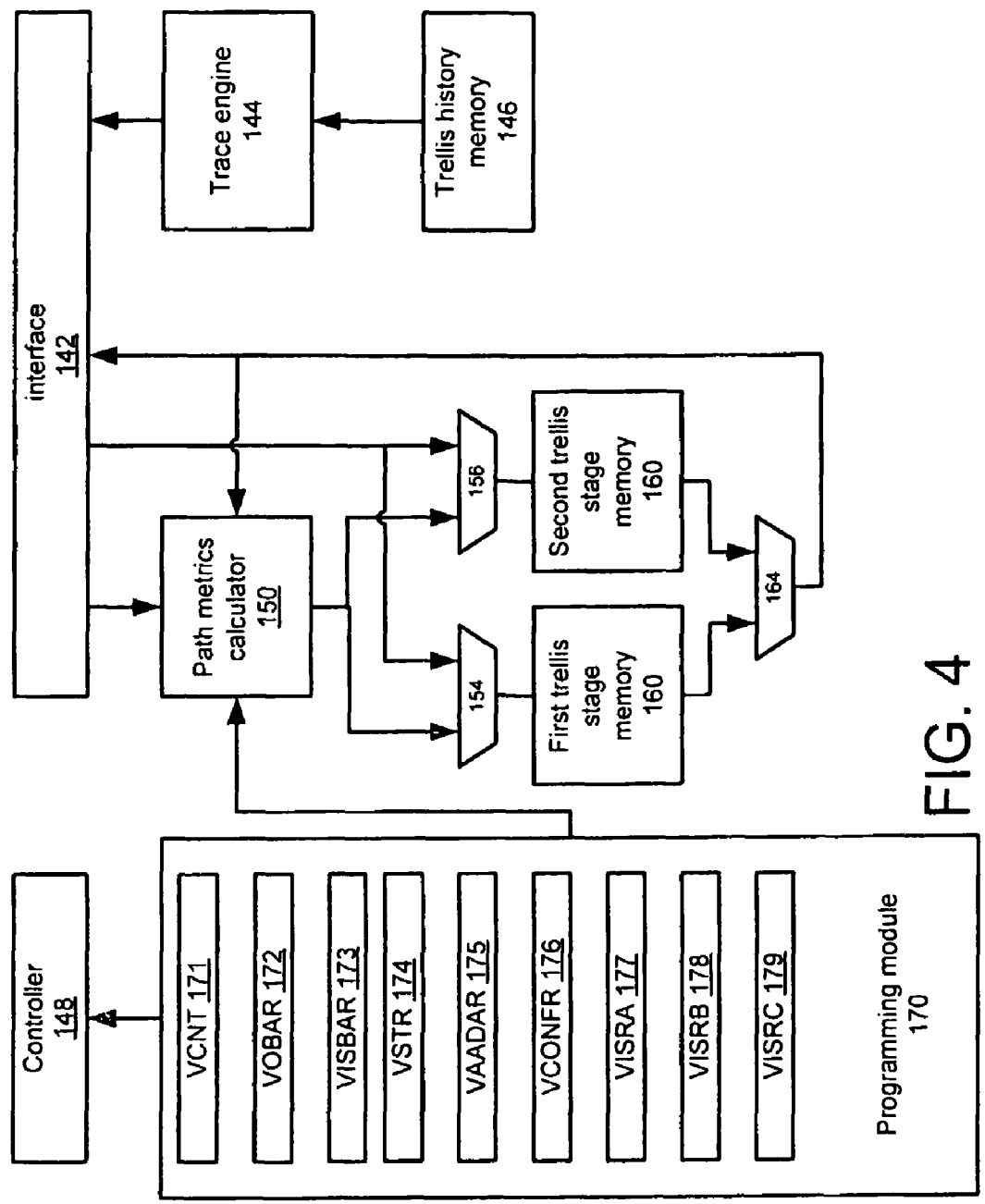
FIG. 4 illustrates a Viterbi co-processor, according to an embodiment of the invention.

FIG. 4 illustrates VCOP 120, according to an embodiment of the invention.

VCOP 120 includes an output interface 142, a trace engine 144, a trellis history memory 146, a controller 148, a programming module 170, a path metrics calculator 150, a first and second trellis stage memories 160 and 162, and multiplexers 154, 156 and 164.

The programming module 170 includes multiple registers such as VCNT resister 171, VOBAR register 172, VISBAR register 173, VISRA register 174, VAADAR register 175, VCONFR register 176 and VSTR register 177.

VCNT resister 171 stores Viterbi decoder trace back mode indication and a trace back starting trellis stage indication. VOBAR register 172 stores an address in memory unit 130 that stores decoded bits during a trace back process or for dumping the trellis history memory 146. VISBAR register 173 stores the address of input symbols to be processed during Viterbi decoding process and the BFTD process.

VISRA, VISRB and VISRC register 177-179 store the possible end points—the trellis stages in which the path metrics stored within the trellis stage memory 160 (or 164) is dumped to memory unit 130. VAADAR register 175 holds the address in memory unit 130 to which path metrics of possible end points are dumped.

VCONFR register 176 stores control bits such as path metric control field, feed forward control bits, history dump control fields, trace back control fields, rate control bits, amount of possible end points bits, history dump interrupt enable bits, feed forward interrupt enable bits, path metrics dump interrupt enable, and the like. VSTR register 174 includes status bits indicative of the status of VCOP, such as which processes (such as trellis history dump, path metrics filling, path metrics clearing and feed forward) were done.

The controller 148 controls the operation of the various components of VCOP 120, according to the control information stored within the programming module 170.

The path metrics calculator 150 performs feed forward processes to provide survivor paths. A feed forward process involves executing multiple butterfly or add compare select (ACS) operations using the first and second trellis stage memories 160 and 162 that are used interchangeably as a current trellis stage memory and a next trellis stage memory. Said interchangeability is achieved by controlling the multiplexers 154, 156 and 164 that are connected to the inputs and outputs of the first and second trellis stage memories 160 and 162.

During a feed forward process the survivor paths are stored in the trellis history memory 146. Conveniently, each state is associated with a flag that reflects which of the two paths that lead to this trellis state is the survivor path. Conveniently, the path metrics of the possible end points are dumped to memory unit 130.

The trace engine 14 is capable of reconstructing a hypothetical trellis path, by reading the mentioned above flags from the trellis history memory 146. The trace engine is capable of outputting the hypothetical trellis path to other components, such as memory unit 130, via output interface 142.

VCOP 120 is capable of generating interrupt requests to DSP 110 once it ends a feed forward process and once it ends a trace back process. It is also capable of generating interrupt requests each time it dumps path metrics.

According to an embodiment of the invention the VCOP 120 and the DSP 110 co-operate to perform a BFTD process. Conveniently, VCOP 120 performs a feed forward process that starts, for example, at a beginning of a trellis frame and ends at the last possible end point 19. During this feed forward process the trellis history memory 146 stores the survivor paths and the path metrics of each of possible end points 11-19 are dumped to memory unit 130.

Once the feed forward process ends the VCOP 120 starts a trace back process from one of the possible end points. Once the VCOP 120 ends to reconstruct a hypothetical trellis path (based upon the trellis history stored within the trellis history memory 146) it issues an interrupt and the DSP 110 calculates CRC parity bits and determines if the CRC passed. If the CRC passed the DSP 110 calculates a false detection variable such as $S(n_{end})$ or a $T(n_{end})$. While the DSP 110 performs these operations the VCOP 120 can perform a trace back process that starts at another possible end point.

The BFTD process can be accelerated by parallel operation of both DSP 110 and the VCOP 120.

Figure 1:
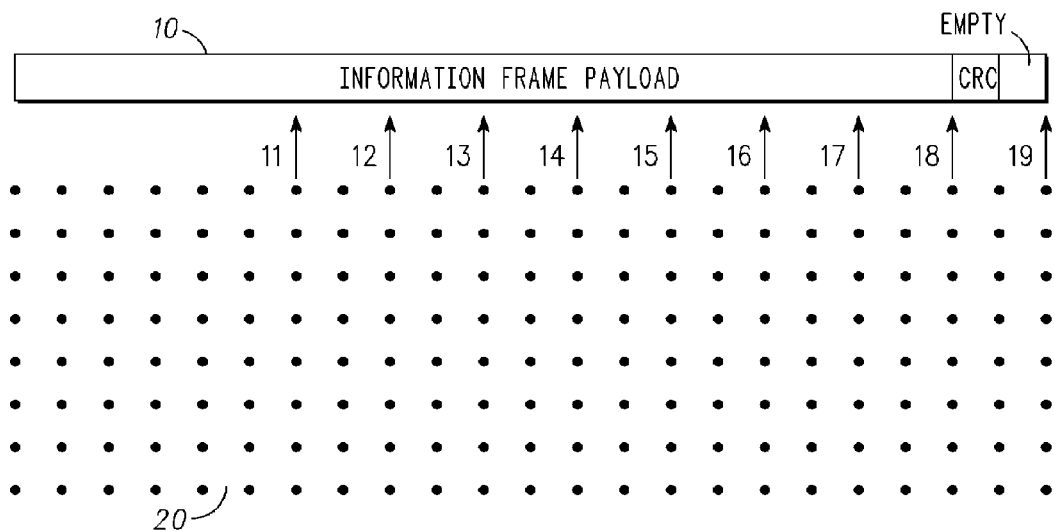
FIG. 1 illustrates an information frame, nine possible frame end points, and a portion trellis diagram that corresponds to the information frame.

Referring to the information frame of FIG. 1, an exemplary BFTD process will include a feed forward process, by the VCOP 120 of the whole information block till the last possible end point 19. This feed forward process is followed of a sequence of trace back processes (starting from different possible end points) that are executed in parallel to CRC checks. Only if a CRC check passes the DSP 110 calculates a false detection variable such as $S(n_{end})$ or a $T(n_{end})$.

Figure 5:
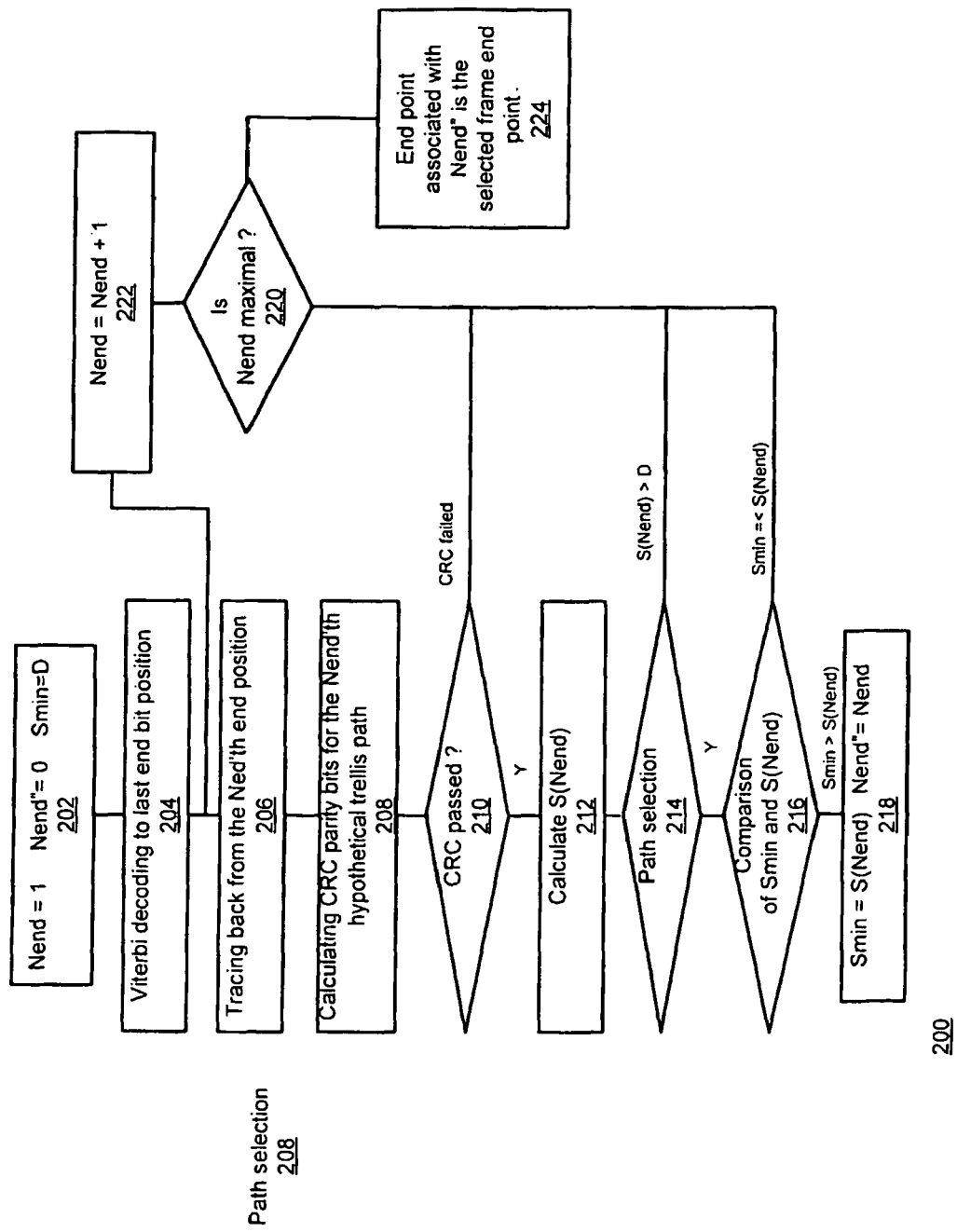
FIGS. 5-6 are flow charts of method for performing a blind transport format detection, according to various embodiments of the invention.

FIG. 5 is a flow chart of method 200 for locating an end of a received frame, according to an embodiment of the invention.

Method 200 starts by stage 202 of setting $n_{end}$ to one (starting from the first possible end point), setting another variable $n_{end}"$ to zero and setting $S_{min}$ to D.

Stage 202 is followed by stage 204 of performing Viterbi decoding from a start point to the last possible end point.

Stage 204 is followed by stage 206 of performing a trace back process from the $n_{end}^{th}$ possible end point in order to provide a hypothetical trellis path.

Stage 206 is followed by stage 208 of performing a forward detection operation such as calculating CRC parity bits for the hypothetical trellis path.

Stage 208 is followed by query stage 210 of checking if the forward detection operation, such as CRC, passed. If the forward detection operation failed query stage 210 is followed by query stage 220. If the forward detection operation passed stage 210 is followed by stage 212 of calculating a false detection variable. Conveniently this variable is $S(n_{end})$ or even $T(n_{end})$, but this is not necessarily so. For simplicity of explanation it is assumed that $S(n_{end})$ is calculated. It is noted that the calculation of the forward detection check is faster, and conveniently much faster, than a calculation of the false detection variable Stage 212 is followed by query stage 214 of determining if $S(n_{end})$ is greater than D. If $D<S(n_{end})$ query stage 214 is followed by query stage 220. If $D=>S(n_{end})$ query stage 214 is followed by stage 216 of comparing $S(n_{end})$ to $S_{min}$.

If $S(n_{end})<S_{min}$ query stage 216 is followed by stage 218 of setting $S_{min}$ to $S(n_{end})$ and setting $n_{end}"$ to $n_{end}$. Else ($S(n_{end}) >= S_{min}$) query stage 216 is followed by query stage 220. Stage 218 is followed by query stage 220.

Query stage 220 involves checking whether stages 204-218 were applied to all possible end points ("is $n_{end}$ the maximal value?").

If the answer is negative than query stage 220 is followed by stage 222 of increasing $n_{end}$ and jumping to stage 206. If all the possible end points were checked query stage 220 is followed by stage 224 of providing the end point associated with $n_{end}"$ as the selected frame end point. If the value of $n_{end}"$ is zero the received frame is declared to be in error.

According to an embodiment of the invention method 200 is executed by at least a first and a second processor, such as but not limited to DSP 110 and VCOP 120, but this is not necessarily so.

According to an embodiment of the invention the first and second processors operate at least partially in parallel. Conveniently, when the first processor executes certain stages in relation to a certain possible end point the other processor executes other stages of method 200 in relation to another possible end point.

According to an embodiment of the invention the Viterbi decoding of stage 240 can involve processing portions of the frame at a time. Thus, once a current frame portion is processed certain information (such as path metrics, trellis history) is stored or dumped and another frame portion is processed. It is further noted that Viterbi decoding can be applied on frame portions that end at a certain point (such as but not limited to a possible end point), and only if further decoding is required for trace back session and/or reconstruction of hypothetical trellis path, then the Viterbi decoding can continue.

Figure 6:
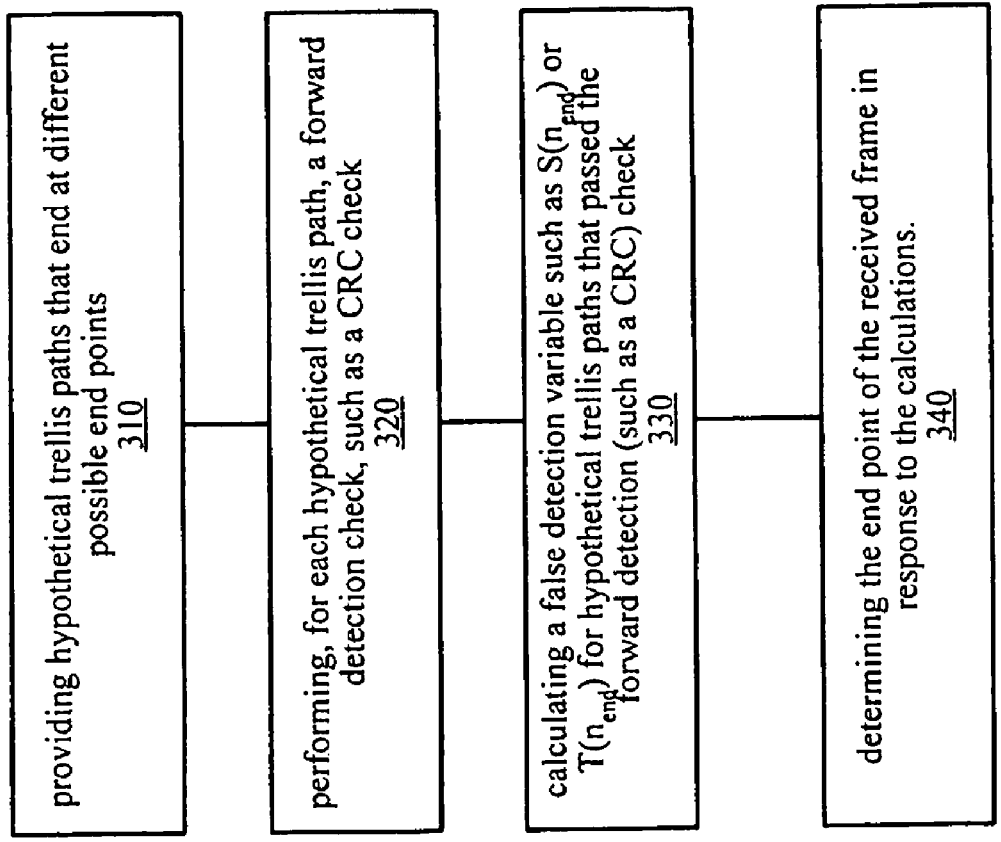

FIG. 6 is a flow chart of method 300 for locating an end of a received frame, according to an embodiment of the invention.

Method 300 starts by stage 310 of providing hypothetical trellis paths that end at different possible end points. Conveniently, stage 310 includes receiving an information frame and performing at least one feed forwards process that starts at a predefined starting trellis stage and can end at a possible ending point.

Conveniently, the feed forward process is executed until is processes a trellis stage that corresponds to a last possible end point out of a group of possible end groups. Conveniently, the path metrics of trellis stages that correspond to possible end points are stored. According to an embodiment of the invention information reflecting surviving paths is also stored.

Referring to the example set forth in FIG. 3 and FIG. 4 stage 310 is executed by VCOP 120, the path metrics of trellis stages corresponding to possible end points are sent to memory unit 130, and the information reflecting the surviving paths is stored within trellis history memory 146.

According to an embodiment of the invention the ending point of the feed forward process can be the last possible end point 19, a point that follows said last possible end point 29 or a point that precedes the last possible end point 19.

Conveniently, the feed forward process is followed by performing a trace back process from a certain possible end point to provide a hypothetical trellis path. During a first iteration of stage 214 the trace back process can start from the first possible end point, but this is not necessarily so as the order of selected possible end points in not significant.

Conveniently, stage 310 includes at least one iteration of stage 204 and multiple iterations of stage 206.

Stage 310 is followed by stage 320 of performing, for each hypothetical trellis path, a forward detection check, such as a CRC check. Conveniently, stage 320 includes multiple iterations of stage 208. Referring to the example set forth in FIG. 3, the CRC calculation can be executed by DSP 110.

According to an embodiment of the invention while VCOP 120 performs a trace back process of a certain hypothetical trellis frame, the DSP 120 performs a CRC check of a previously provided hypothetical trellis path.

Stage 320 is followed by stage 330 of calculating a false detection variable such as $S(n_{end})$ or $T(n_{end})$ for hypothetical trellis paths that passed the forward detection (such as a CRC) check. The calculation of the forward detection check is faster and conveniently even much faster, than a calculation of the false detection variable According to an embodiment of the invention while VCOP 120 performs a trace back process of a certain hypothetical trellis frame, the DSP 120 can also calculate the false detection variable.

Conveniently, stage 330 includes multiple iterations of a process path that includes stages 210 and 212. It is noted that if the CRC check fails the mentioned above variables are not calculated.

Stage 330 is followed by stage 340 of determining the end point of the received frame in response to the calculations. Conveniently, stage 340 includes multiple iterations of stages 216, 218, and 224.

According to an embodiment of the invention the determination can be finding the possible end point that is associated with the smallest $S(n_{end})$ and where its $S(n_{end})$ is smaller than D.

According to an embodiment of the invention stage 310 of providing hypothetical trellis paths is executed by a first processor, such as but not limited to VCOP 120, and stage 320 of performing a CRC check, and even calculating false detection variables is executed by another processor, such as but not limited to DSP 110.

According to an embodiment of the invention stage 340 of determining is responsive to a relationship between threshold D and the calculated variable, wherein the threshold D can be varied during method 300, or between sessions of method 300.

Conveniently, the calculation of a certain hypothetical trellis path is executed in parallel to performing, for a previously calculated hypothetical trellis path, a CRC check or even in parallel to a calculation of false detection variables for a previously provided hypothetical trellis paths that passed a CRC check.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for locating an end of a received frame, the method comprising:
    providing at a processor device hypothetical trellis paths that end at different possible end points;
    performing at the processor device, for each hypothetical trellis path, a forward detection check;
    calculating at the processor device a false detection variable for hypothetical trellis paths that passed the forward detection check, wherein a calculation of the forward detection check is faster than a calculation of the false detection variable; and
    determining at the processor device the end point of the received frame in response to the calculations.

2. The method of claim 1 wherein the forward detection check is a CRC.

3. The method of claim 1 wherein providing hypothetical trellis paths is executed by a first processor and wherein the stage of performing a forward detection check is executed by another processor.

4. The method of claim 1 wherein providing comprises performing a feed forward trellis calculation.

5. The method of claim 4 wherein providing comprises storing path metrics of possible end points.

6. The method of claim 1, wherein providing comprises storing information indicative of survivor paths.

7. The method of claim 1, wherein providing comprises performing a trace back process.

8. The method of claim 7 wherein performing the trace back process comprises retrieving previously stored information indicative of survivor paths.

9. The method of claim 1, wherein determining is responsive to a relationship between a threshold and the calculated variable and wherein the method comprises altering the threshold.

10. The method of claim 1 wherein providing comprises calculating a hypothetical trellis path.

11. The method of claim 9 wherein calculating of a hypothetical trellis path while performing, for a previously calculated hypothetical trellis path, a forward detection check.

12. The method of claim 1, and comprising calculating at the processor device a hypothetical trellis path while calculating a false detection variable for a previously provided hypothetical trellis path that passed a CRC.

13. A device for locating an end point of a received frame, the device comprises at least one memory unit for storing path metrics;
    at least one processor, adapted to:
    provide hypothetical trellis paths that end at different possible end points; perform, for each hypothetical trellis path, a forward detection check;
    calculate a false detection variable for hypothetical trellis paths that passed the forward check wherein a calculation of the forward detection check is faster than a calculation of the false detection variable; and determine the end point of the received frame in response to the calculations.

14. The device of claim 13 wherein a first processor is adapted to provide hypothetical trellis paths that end at different possible end points; and
    a second processor is adapted to perform, for each hypothetical trellis path, a forward detection check.

15. The device of claim 14 wherein the first and second processors operate, at least partially, in parallel to each other.

16. The device of claim 13, wherein a first processor is adapted to provide hypothetical trellis paths that end at different possible end points; and a second processor is adapted to calculate a false detection variable for hypothetical trellis paths that passed the forward detection check.

17. The device of claim 16 wherein the first and second processors operate, at least partially, in parallel to each other.

18. The device of claim 13, wherein at least one processor is adapted to perform a feed forward trellis calculation.

19. The device of claim 18 wherein at least one processor is adapted to store, within at least one memory unit, path metrics of possible end points.

20. The device of claim 13, wherein at least one processor is adapted to store within at least one memory unit, information indicative of survivor paths.

21. The device of claim 13, wherein at least one processor is adapted to perform a trace back process.

22. The device of claim 13, wherein at least one processor is adapted to retrieve previously stored information indicative of survivor paths during a trace back process.

23. The device of claim 13, wherein at least one processor is adapted to determine the end point of the received frame in response to a relationship between a threshold and the calculated variable and wherein the device is capable of altering the threshold.

24. A receiver comprising a device for locating an end of a received frame as claimed in claim 13.

* * * * *